(12) United States Patent
Reilly

(10) Patent No.: US 8,613,587 B2
(45) Date of Patent: Dec. 24, 2013

(54) ROTOR ASSEMBLY FOR A TURBINE

(71) Applicant: Francis X. Reilly, Framingham, MA (US)

(72) Inventor: Francis X. Reilly, Framingham, MA (US)

( * ) Notice: Subject to any disclaimer, the term of this patent is extended or adjusted under 35 U.S.C. 154(b) by 0 days.

(21) Appl. No.: 13/771,532

(22) Filed: Feb. 20, 2013

(65) Prior Publication Data

US 2013/0216358 A1 Aug. 22, 2013

Related U.S. Application Data

(60) Provisional application No. 61/601,247, filed on Feb. 21, 2012.

(51) Int. Cl.
*F03D 7/06* (2006.01)

(52) U.S. Cl.
USPC ............ 415/4.2; 415/125; 415/907; 416/109; 416/116

(58) Field of Classification Search
USPC ........... 415/4.1, 4.2, 4.4, 125, 907; 416/9, 10, 416/109, 116, 142, 167
See application file for complete search history.

(56) References Cited

U.S. PATENT DOCUMENTS

| 14,997 | A | * | 6/1856 | Battey | 415/4.2 |
| 171,962 | A | * | 1/1876 | Stephens et al. | 415/4.1 |
| 326,718 | A | * | 9/1885 | Collins | 415/61 |
| 381,679 | A | * | 4/1888 | Devereux | 415/4.4 |
| 557,681 | A | * | 4/1896 | Johnson | 415/4.2 |
| 620,838 | A | * | 3/1899 | Bergsland | 415/32 |
| 969,587 | A | * | 9/1910 | Williams | 415/4.3 |
| 1,225,033 | A | * | 5/1917 | Jackson | 415/141 |
| 1,460,114 | A | * | 6/1923 | Shelton | 415/4.2 |
| 4,057,270 | A | * | 11/1977 | Lebost | 290/54 |
| 2003/0185666 | A1 | * | 10/2003 | Ursua | 415/4.2 |
| 2007/0098542 | A1 | * | 5/2007 | Streeman et al. | 415/4.2 |
| 2010/0045039 | A1 | * | 2/2010 | Stroup et al. | 290/44 |

* cited by examiner

*Primary Examiner* — Edward Look
*Assistant Examiner* — Aaron R Eastman
(74) *Attorney, Agent, or Firm* — Kriegsman & Kriegsman

(57) ABSTRACT

A rotor assembly for a turbine includes a substantially enclosed, cylindrical outer housing that is shaped to define an interior cavity into which a rotor is disposed. The rotor includes a main rotatable shaft in coaxial alignment with the outer housing and a plurality of pivotable blades, each blade being connected to the shaft by upper and lower spokes. In use, fluid flow enters into the interior cavity through a selectively enclosable inlet port in the outer housing, applies force to blades within the primary fluid flow path which causes the main shaft to rotate, and exits the interior cavity though a selectively enclosable outlet port in the outer housing. As the main shaft rotates within the outer housing, a control mechanism maintains each blade in a position of limited resistance when located outside the primary fluid flow path in order to maximize efficiency.

15 Claims, 6 Drawing Sheets

ROTOR ASSEMBLY FOR A TURBINE

FIELD OF THE INVENTION

The present invention relates generally to devices that convert mechanical energy generated from fluid flow forces, such as wind, into electricity and more particularly to spin mechanisms for said devices.

BACKGROUND OF THE INVENTION

A turbine is a machine that includes a moving component, commonly referred to in the art as a rotor, or spin mechanism, which is mechanically driven using the energy from a fluid flow, such as wind, steam or water. The spin mechanism typically includes a main shaft, or drum, from which a plurality of blades project. In use, the moving fluid is drawn into contact against the blades so as to impart rotational energy onto the rotor. The turbine then converts the rotational energy into other forms of energy, such as electrical energy, to optimize its usefulness.

A wind turbine is one form of turbine that utilizes naturally occurring wind energy to produce electrical energy. One type of wind turbine that is well known in the art includes a rotor with a plurality of enlarged propeller-like blades, or fins, that project radially outward from a common shaft in an equidistantly spaced arrangement. Depending on the orientation of the common shaft, the plurality of blades is adapted to rotate along a vertical or horizontal plane. Typically, the blades of the rotor are mounted at a significant elevation (e.g., on the top of an enlarged steel tube tower or other similar structural support) to maximize direct exposure to wind forces.

By coupling the rotor shaft to an electromechanical device, such as a generator, the rotational energy generated from the fluid flow forces can be converted into electrical energy. In this manner, wind turbines are able to produce electricity from fluid flow forces that are naturally occurring. Accordingly, it is to be understood that the naturally occurring fluid flow forces serve as a non-consumable, carbon-free fuel for producing environmentally-friendly, or clean, electricity, which is highly desirable.

As referenced briefly above, the spin mechanism for conventional wind turbines typically relies on an open blade construction (i.e., with the blades uncovered and externally exposed). As can be appreciated, the open blade construction used in traditional wind turbines has been found to introduce a number of notable drawbacks.

As a first drawback, the open blade construction used in traditional wind turbines has been found to create an environmental danger to wildlife. Most notably, birds that fly within the immediate environment of the turbine are susceptible of being struck by the rotating blades. To promote greater wildlife safety, turbine blade speed is often significantly reduced. However, a significant reduction in rotor speed is typically achieved by substantially increasing the overall size of the turbine blades. As can be appreciated, a sizable increase in turbine blade size often creates significant zoning and aesthetics issues.

As a second drawback, the open blade construction used in traditional wind turbines has been found to be relatively inefficient. Among other things, traditional wind turbines provide no means to harness, or otherwise control, the wind flow used to drive the rotor, thereby rendering their manufacture and operation rather expensive in nature.

As a third drawback, the open blade construction used in traditional wind turbines has been found to produce a significant amount of noise during normal operation, which is highly undesirable.

SUMMARY OF THE INVENTION

It is an object of the present invention to provide a new and improved spin mechanism for a turbine.

It is another object of the present invention to provide a spin mechanism for a turbine that is highly efficient and maximizes the output power produced therefrom.

It is yet another object of the present invention to provide a spin mechanism for a turbine of the type as described above that is environmentally friendly and safe to airborne wildlife.

It is still another object of the present invention to provide a spin mechanism for a turbine of the type as described above that is compact, includes a minimal number of parts, is durable in its construction, is easy to use, and is inexpensive to manufacture.

Accordingly, as a principal feature of the present invention, there is provided a rotor assembly for a turbine, the rotor assembly being powered by a fluid flow, the rotor assembly comprising (a) a substantially enclosed outer housing shaped to define an interior cavity, and (b) a rotor disposed within the interior cavity, the rotor comprising, (i) a main shaft having a longitudinal axis, and (ii) a plurality of blades coupled to the main shaft, (iii) wherein the rotor is adapted to spin about the longitudinal axis of the main shaft.

Various other features and advantages will appear from the description to follow. In the description, reference is made to the accompanying drawings which form a part thereof, and in which is shown by way of illustration, various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE INVENTION

Construction of Rotor Assembly 11

Figure 1:
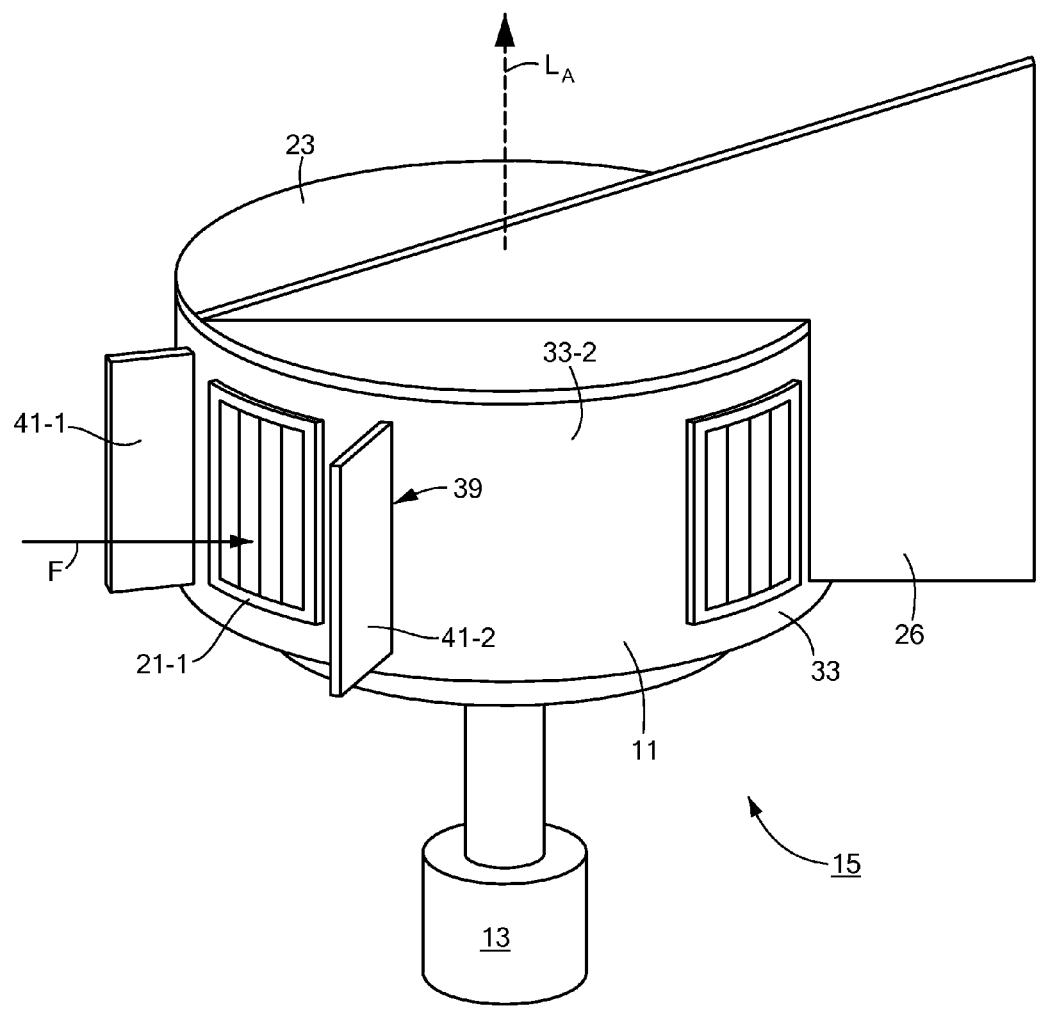
FIG. 1 is a top perspective view of a first embodiment of a rotor assembly constructed according to the teachings of the present invention, the rotor assembly being shown coupled to an electromechanical device to form a turbine.

Referring now to FIG. 1, there is shown a rotor assembly that is constructed according to the teachings of the present invention, the rotor assembly being identified generally by reference numeral 11. As will be described further below, rotor assembly 11 is adapted to be coupled to an electromechanical device 13, such as a generator, to form a turbine 15. Accordingly, in use, rotor assembly 11 is designed to be mechanically driven using the energy from a fluid flow F, with the resultant mechanical energy, in turn, being converted into electrical energy by electromechanical device 13.

For purposes of simplicity only, rotor assembly 11 is described herein as being powered by a fluid flow F in the form of wind. However, it should be noted that rotor assembly 11 is not limited to being powered by wind. Rather, it is to be understood that rotor assembly 11 is designed to receive power from any type of fluid flow, such as a wind, steam, water or the like, without departing from the spirit of the present invention.

Figure 2:
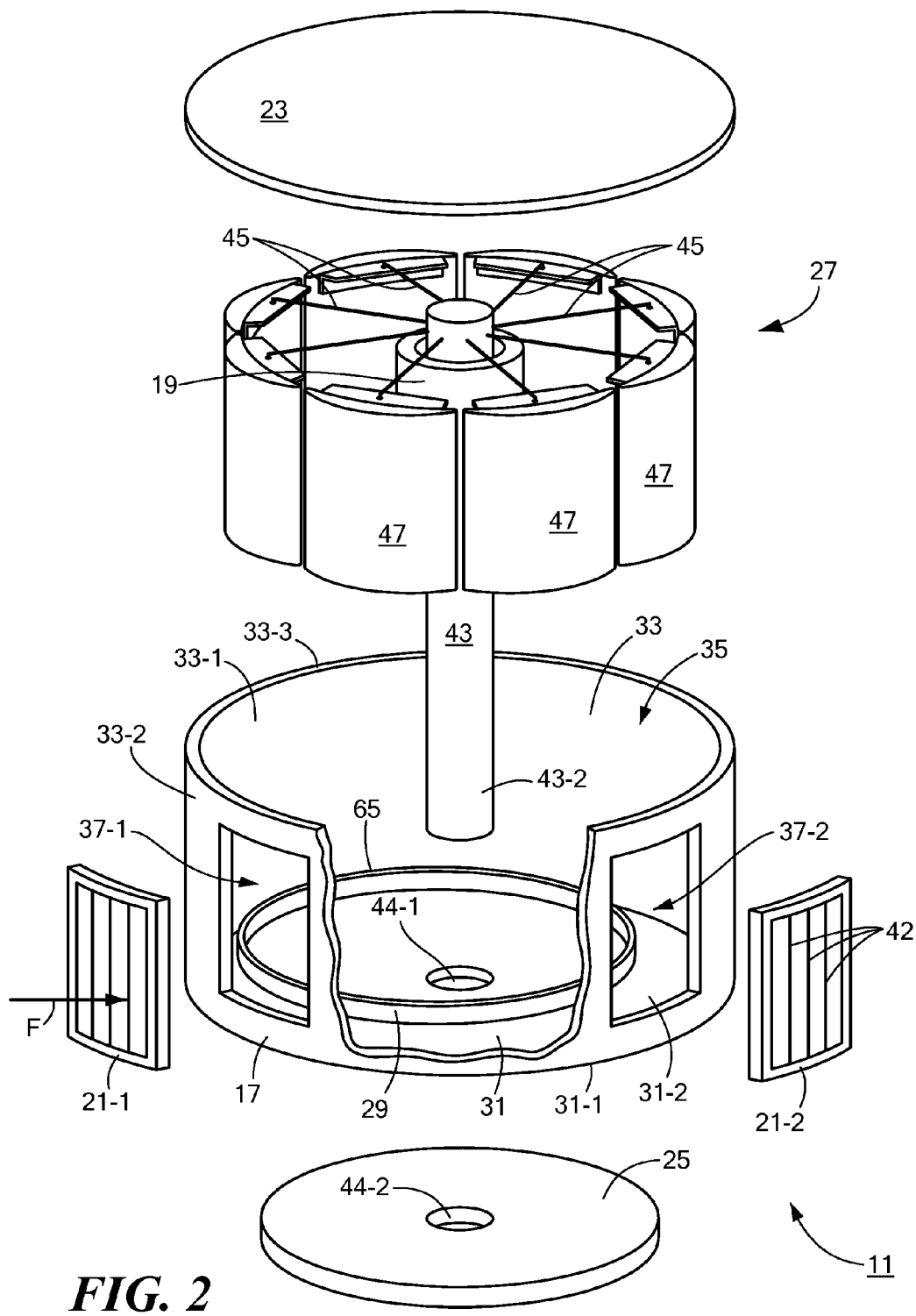
FIG. 2 is a partially exploded, top perspective view of the rotor assembly shown in FIG. 1, the baffle and vane being shown removed therefrom and the outer housing being broken away in part for ease of illustration.

As seen most clearly in FIG. 2, rotor assembly 11 comprises a generally cylindrical outer housing 17, a cylindrical inner housing 19 disposed within outer housing 17 in a coaxial relationship relative thereto, a pair of selectively enclosable elements 21-1 and 21-2 mounted within corresponding openings in outer housing 17, a cover 23 mounted on top of outer housing 17, a rotating platform 25 mounted onto the underside of outer housing 17, a rotor 27 adapted to spin within outer housing 17, and a control mechanism 29 for regulating the orientation of selected components of rotor 27.

Outer housing 17 is a unitary device that is preferably constructed out of a rigid and durable material, such as metal, plastic or a composite thereof. As seen most clearly in FIG. 2, outer housing 17 includes a base 31 and a continuous sidewall 33 that extends orthogonally upward from the periphery of base 31, sidewall 33 comprising an inner surface 33-1, an outer surface 33-2 and a circular top edge 33-3. Together, base 31 and sidewall 33 define an enlarged, substantially enclosed interior cavity 35 in which selected components of rotor assembly 11 are disposed. As will be described further below, the substantially enclosed nature of interior cavity 35 enhances the thermodynamic properties of wind flow therethrough and therefore serves as a feature of the present invention.

It is to be understood that the particular dimensions of outer housing 17 (and, as a consequence, the overall footprint of rotor assembly 11) can vary according to the intended application. Specifically, the diameter of outer housing 17 could be as small as 1 foot or less and as large as 100 feet or greater, with the remaining components of rotor assembly 11 being appropriately scaled in accordance therewith.

Inlet and outlet ports 37-1 and 37-2 are formed into outer housing 17 in communication with interior cavity 35, ports 37-1 and 37-2 being preferably formed approximately 90 degrees apart from one another about the longitudinal axis $L_A$ of outer housing 17. Due to the degree of angular separation of ports 37 in outer housing 17, a fluid flow path is formed therebetween that is generally linear.

Each port 37 preferably has a rectangular shape, the dimensions of which roughly correspond to the dimensions of selected components in rotor 27, as will be described further below. In use, fluid flow F is optimally designed to enter into cavity 35 through inlet port 37-1, mechanically drive rotor 27 with maximum force and efficiency, and in turn exit cavity 35 through outlet port 37-2 along the linear path.

Referring back to FIG. 1, a baffle 39 is mounted onto outer surface 33-2 of sidewall 33 in close proximity to inlet port 37-1 and serves, inter alia, to funnel wind into interior cavity 35. Baffle 39 is represented herein as a pair of rectangular, planar panels 41-1 and 41-2 that project radially out from outer surface 33-2 of sidewall 33 on opposing sides of inlet port 37-1. However, it is to be understood that alternatively configured baffles (e.g., a unitary, rectangular funnel-style baffle) could be used in place thereof without departing from the spirit of the present invention.

Figure 3:
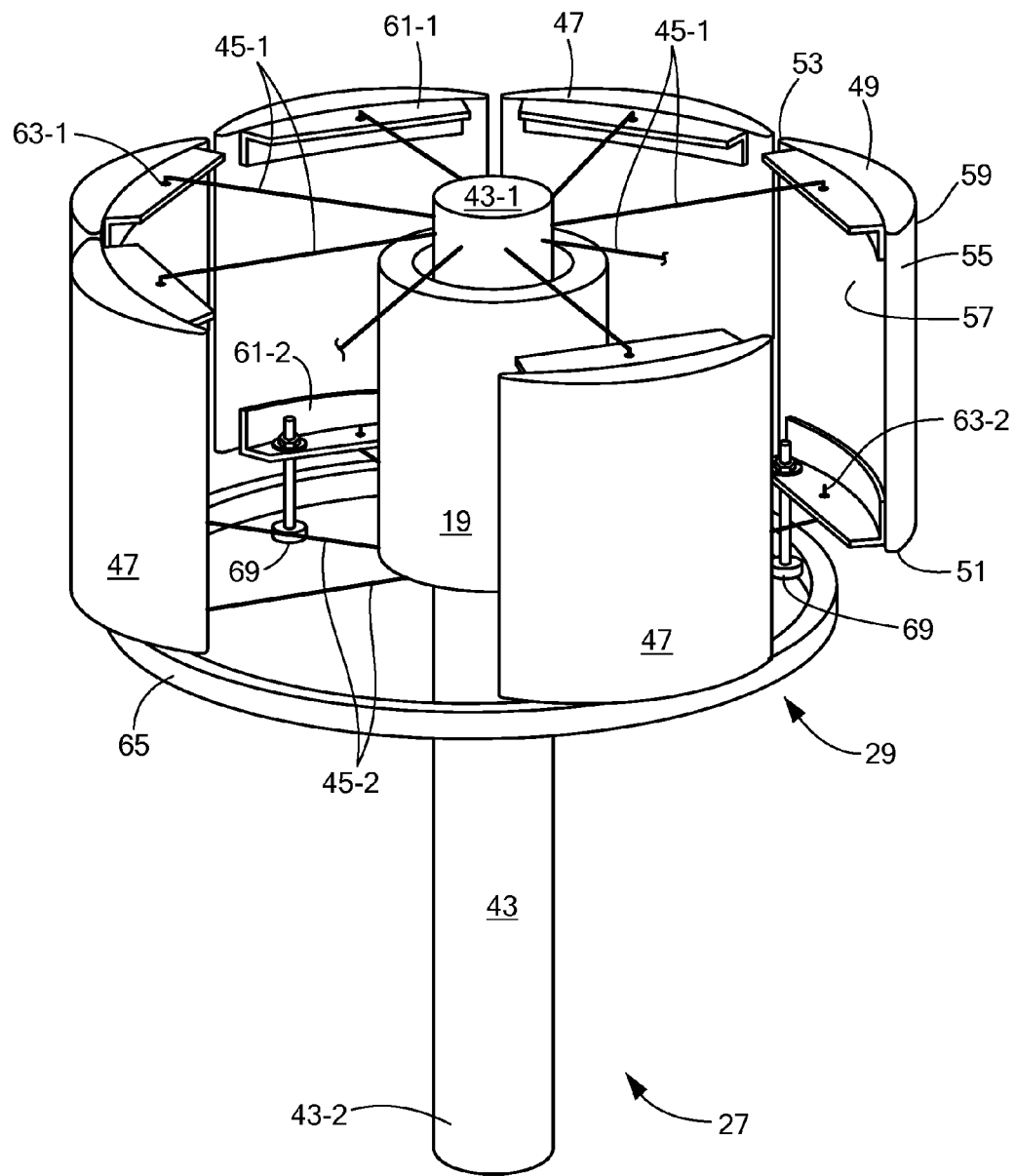
FIG. 3 is an enlarged, fragmentary, perspective view, of the inner housing, rotor and rotor orientation control mechanism assembly shown in FIG. 1, with selected rotor blades and spokes being removed therefrom for ease of illustration.
Figure 4:
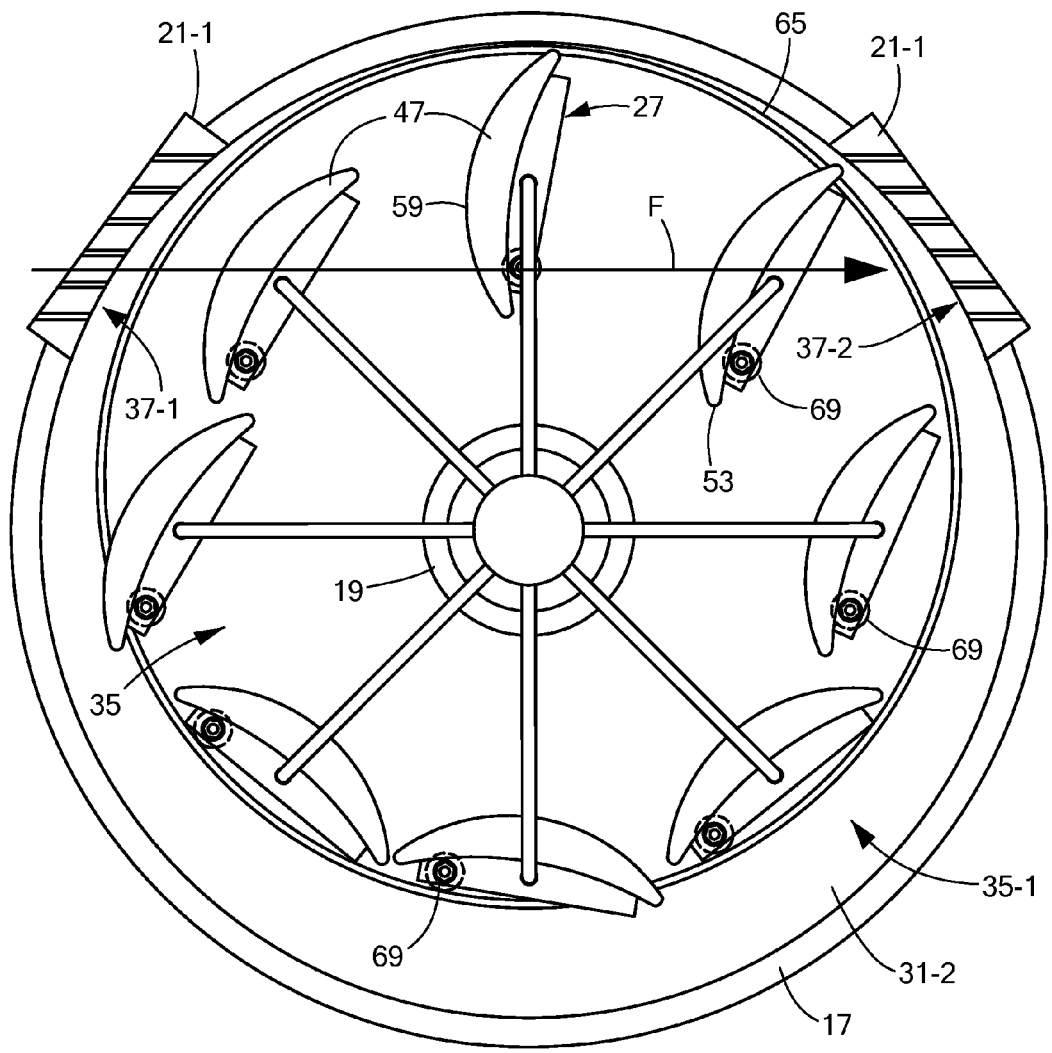
FIG. 4 is a top view of the rotor assembly shown in FIG. 1, the rotor assembly being shown with its cover, vane and baffle removed therefrom to more easily illustrate the orientation of the plurality of blades during normal operation.

Referring now to FIGS. 2-4, inner housing 19 is a unitary cylindrical member that is preferably constructed out of a rigid and durable material, such as metal, plastic or a composite thereof. As seen most clearly in FIG. 4, inner housing 19 extends coaxially within outer housing 17, with the diameter of inner housing 19 being less than the diameter of outer housing 17. Together, inner housing 19 and outer housing 17 define a substantially enclosed annular region 35-1 within interior cavity 35 within which the majority of rotor 27 is disposed for rotation. As a feature of the present invention, it is to be understood that that the inclusion of inner housing 19 serves to deflect fluid flow F away from the center of interior cavity 35 and into outer portion of rotor 27, thereby maximizing efficiency.

As seen most clearly in FIGS. 1 and 2, selectively enclosable elements, or doors, 21-1 and 21-2 are fittingly disposed within ports 37-1 and 37-2, respectively. In the present embodiment, each door 21 is represented herein as a vent, or grate, with a plurality of parallel fins 42 that can be pivoted between open and closed positions using a common actuation lever (fins 42 being represented as closed in FIGS. 1 and 2). In this capacity, each door 21 can be used as an emergency means for instantly shutting down operation of rotor assembly 11 by precluding the passage of fluid flow F therethrough, thereby eliminating any environmental dangers commonly associated with traditional wind turbines (e.g., the harming of wildlife).

Top cover 23 is a generally disc-shaped member that is preferably mounted onto top edge 33-3 of sidewall 33 and thereby serves to substantially enclose interior cavity 35. Although not shown herein, a plurality of vertically disposed support rods, or ribs, can be secured to sidewall 33 in a spaced apart relationship in order to provide structural rigidity to outer housing 17.

Rotating platform 25 is preferably constructed as a Lazy Susan style, rotating disc-shaped member that is fixedly coupled to exterior surface, or underside, 31-1 of base 31. As can be appreciated, rotating platform 25 enables outer housing 17 to be rotated about longitudinal axis $L_A$ in order to dispose ports 37 in the optimal position to accommodate for variations in the wind flow direction.

An enlarged, flattened, planar tail, or vane, 26 extends across cover 23 and projects out from outer surface 33-2 of sidewall 33 in proximity to outlet port 37-2, as seen in FIG. 1. It should be noted that vane 26 extends across cover 23 in direct alignment with the distal edges of ports 37 (i.e., the edges of ports 37-1 and 37-2 that are the farthest apart from one another angularly). As a result, vane 26 extends in a co-linear relationship with the primary path of fluid flow F. Accordingly, in use, vane 26 serves to orientate outer housing 17 about longitudinal axis $L_A$ such that the natural wind flow direction travels linearly between inlet port 37-1 and outlet port 37-2, thereby rendering rotor assembly 11 self-orientating to maximize the use of fluid flow F. Although not shown herein, it is to be understood that vane 26 is preferably permanently welded to sidewall 33 and is releasably secured to cover 23 using the combination of a bracket and a fastening element (e.g., a bolt) to allow for removal of cover 23 from outer housing 17, as needed.

As noted briefly above, rotor 27 is disposed primarily within interior cavity 35 and is designed to spin using the energy from fluid flow F. As seen most clearly in FIGS. 2 and 3, rotor 27 comprises a main shaft 43 that includes a first section 43-1 that extends through inner housing 19 in a coaxial relationship relative thereto. In the present invention, first section 43-1 of main shaft 43 is shown spaced away from inner housing 19 and independently movable relative thereto. However, it is to be understood that inner housing 19 need not be separate from first section 43-1 of main shaft 43, but rather, could be fixedly coupled or integrally formed without departing from the spirit of the present invention.

Main shaft 43 includes a second section 43-2 that fittingly projects through a corresponding circular opening 44-1 formed into base 31 of outer housing 17 and a corresponding circular opening 44-2 formed into rotating platform 25. As a result, second section 43-2 of main shaft 43 is rendered externally exposed and therefore available for mechanical coupling to electromechanical device 13, which is in turn preferably electrically connected to both externally accessible controls (not shown) and a power storage device, or battery (not shown). As can be appreciated, main shaft 43 is adapted to rotate about longitudinal axis $L_A$ relative to outer housing 17. This axial rotation of main shaft 43 is received as mechanical energy by electromechanical device 13, which converts the mechanical energy into electrical energy.

Eight pairs of arms, or spokes, 45 extend radially out from main shaft 43 in a spaced apart relationship relative to opposite ends of in inner housing 19, with each pair of adjacent arms 45 being equidistantly spaced apart (i.e., with approximately 45 degrees of separation between adjacent spokes 45). As seen most clearly in FIG. 3, each pair of arms 45 includes an upper spoke 45-1 and a lower spoke 45-2 that share the same angular orientation relative to main shaft 43.

A generally crescent-shaped blade, or fin, 47 extends vertically between each pair of arms 45 and is pivotally coupled thereto, as will be described further below. Each blade 47 includes a top edge 49, a bottom edge 51, a first edge 53, and a second edge 55, a concave, or inner, surface 57 and a convex, or outer, surface 59. As a feature of the invention, the aerodynamic curvature of each blade 47 serves to maximize the rotation of main shaft 43 as fluid flow F passes through interior cavity 35 of rotor assembly 11.

It should be noted that rotor 27 is not limited to a particular number of blades 47 and spokes 45. Rather, it is to be understood that the number of blades 47 and spokes 45 could be increased or decreased to suit a particular application without departing from the spirit of the present invention.

It should also be noted that each blade 47 need not be limited to a generally crescent shape in transverse cross-section. Rather, it is to be understood that the cross-sectional shape of each blade 47 could be modified, as needed, to provide varying aerodynamic properties without departing from the spirit of the present invention.

In the present embodiment, each blade 47 preferably has a width of approximately 3 inches and a height of approximately 12 inches. It is to be understood that each port 37 in outer housing 17 similarly includes a width of approximately 3 inches and a height of approximately 12 inches. By matching the dimensions of each port 37 with the dimensions of each blade 47, wind is efficiently utilized to drive rotor 27, which is highly desirable.

As referenced briefly above, each blade 47 is adapted to rotate relative to the pair of spokes 45 to which it is coupled. Specifically, as seen most clearly in FIGS. 3 and 4, upper and lower L-shaped brackets 61-1 and 61-2 are fixedly mounted onto concave surface 57 of each blade 47 along top and bottom edges 49 and 51, respectively. Furthermore, upper and lower pivot pins 63-1 and 63-2 are integrally formed and extend orthogonally downward and upward, respectively, from the free ends of upper and lower spokes 45-1 and 45-2, respectively. Pins 63-1 and 63-2 are dimensioned for insertion through corresponding holes formed in brackets 49-1 and 49-2, respectively. In this manner, each blade 47 is capable of pivoting about the coaxially aligned upper and lower pins 63-1 and 63-2.

Control mechanism 29 serves to selectively control the orientation of blades 47 when rotor 27 spins within outer housing 17. In the present embodiment, control mechanism 29 comprises a guide ring 65 that is fixedly mounted onto inner surface 31-2 of base 31. As can be appreciated, the diameter of guide ring 65 is substantially less than the diameter of outer housing 17. For reasons to become apparent below, guide ring 65 is axially offset relative to outer housing 17 (i.e., disposed out of coaxial alignment) such that guide ring 65 protrudes substantially into interior cavity 35 in the region of cavity 35 that falls outside of the primary fluid flow path between inlet port 37-1 and outlet port 37-2, as seen most clearly in FIG. 4.

Control mechanism 29 additionally includes a guide roller 69 that extends downward from the inner portion of each lower bracket 61-2. As seen most clearly in FIG. 4, control mechanism 29 serves to control the orientation of blades 47 in order to optimize the aerodynamic properties of rotor 27. In particular, when positioned directly within the primary path of fluid flow F (i.e., in the direct path between inlet port 37-1 and outlet port 37-2), each blade 47 naturally extends in a generally radial orientation to maximize wind force and, as a result, power efficiency. To the contrary, when positioned outside the primary fluid flow path (i.e., in the lower half of interior cavity 35 as shown in FIG. 4), guide roller 69 contacts guide ring 65 as first edge 53 of each blade 47 begins to naturally pivot outward. As such, control mechanism 29 limits the degree that blades 47 pivot. Accordingly, each blade 47 is designed to rotate into a non-radial orientation when traveling through the return path region of interior cavity 35 (i.e., outside the primary fluid flow path) and thereby minimize wind resistance and drag, which is highly desirable.

Operation of Rotor Assembly 11

In use, rotor assembly 11 can be used in the following manner to provide mechanical energy to electromechanical device 13 to create a novel wind turbine 15. Specifically, rotor assembly 11 is preferably mounted onto a support structure at a height well-suited to receive wind forces and is rotated about its longitudinal axis by tail 26 (via platform 25) to accommodate for variations in wind flow direction.

With second section 43-2 of main shaft 43 coupled to electromechanical device 13, doors 21 are disposed in their open positions, thereby enabling wind flow F to enter through inlet port 37-1. As a feature of the present invention, the location of baffle 39 around inlet port 37-1 creates a canyon effect that increases the amount of wind that enters rotor assembly 11.

Referring now to FIG. 4, as wind flow F enters interior cavity 35, blades 47 located within the path between inlet port 37-1 and 37-2 are driven by wind flow F using both (i) a pushing force directly on its convex surface 59 (i.e., in a similar fashion that a sail on a boat is pushed by wind) and (ii) aeronautical lift caused as wind flow F passes around the curved surface 59 of blade 47. In addition, the substantially enclosed nature of the annular cavity defined between inner housing 19 and outer housing 17 ensures that all wind flow is utilized to drive rotor 27. This rotational force applied to rotor 27 by wind flow F creates mechanical energy that is then utilized by electromechanical device 13 to create electricity.

As referenced briefly above, control mechanism 29 ensures that blades 47 pivot roughly 90 degrees from its radial orientation when traveling outside the primary fluid flow path (i.e., the lower region of interior cavity 35). In this manner, blades 47 do not create resistance, or drag, when traveling outside the primary fluid flow path.

If operation of rotor assembly 11 needs to be temporarily suspended (e.g., for servicing), doors 21 are disposed in their closed positions. As such, wind flow F is unable to enter interior cavity 35 and spin rotor 27.

Additional Embodiments

Numerous modifications and variations of the present invention are possible in view of the above teachings. It is therefore to be understood that the scope of the appended claims for the present invention may be practiced otherwise than specifically described.

As an example, rotor assembly 11 need not include control mechanism 29 or any other similar means for controlling the orientation of each blade 47 as rotor 27 spins. Rather, it is to be understood that rotor assembly 11 could be redesigned such that the orientation of rotatable blades 47 is not controlled.

Figure 5:
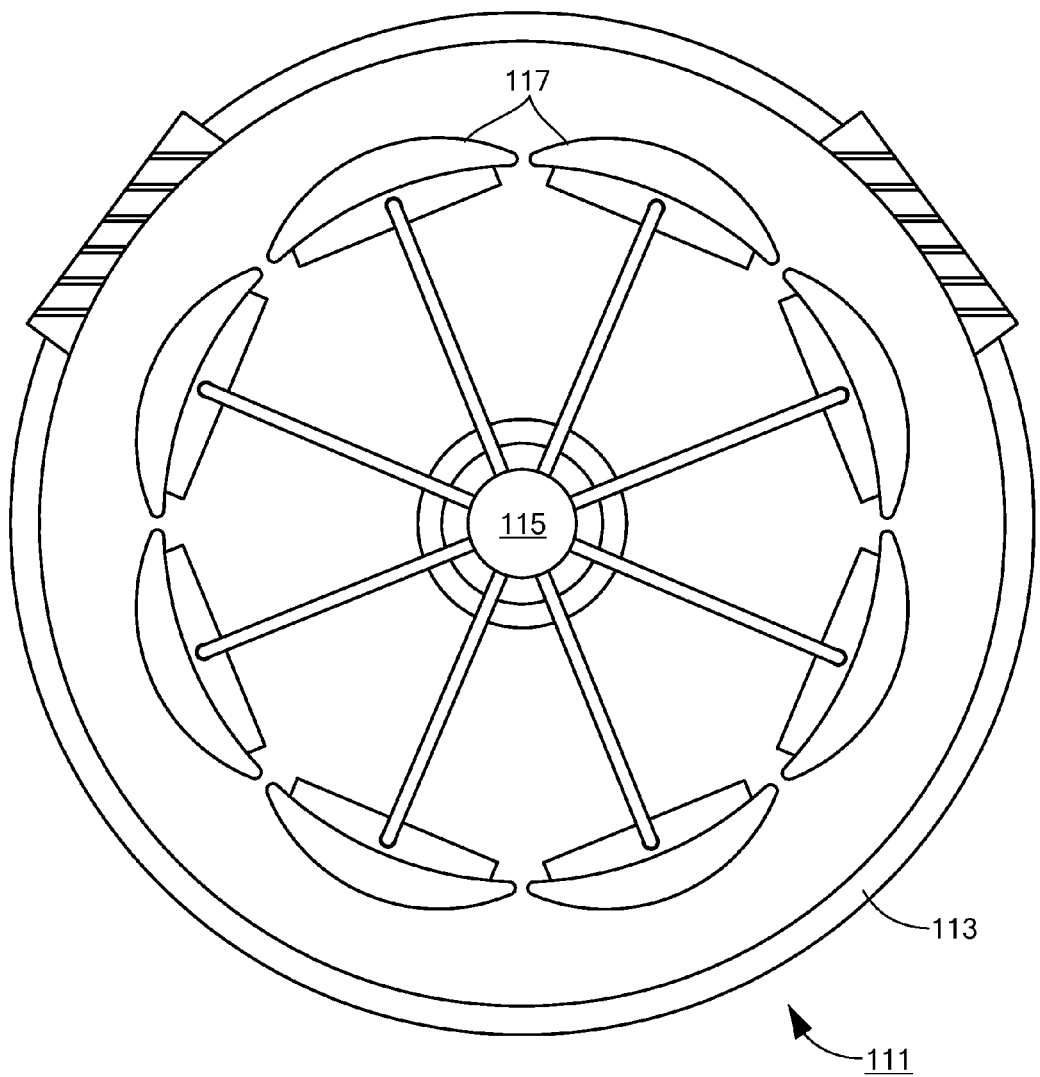
FIG. 5 is a top view of a second embodiment of a rotor assembly constructed according to the teachings of the present invention, the rotor assembly being shown with its cover, vane and baffle removed therefrom to more easily illustrate the orientation of the plurality of blades during normal operation.

Specifically, referring now to FIG. 5, there is shown a simplified schematic representation of a second embodiment of a rotor assembly constructed according to the teachings of the present invention, the rotor assembly being identified generally by reference numeral 111. As can be appreciated, rotor assembly 111 is similar to rotor assembly 11 in that rotor assembly 111 includes a cylindrical outer housing 113 inside which a rotor 115 is adapted to spin, with rotor 115 comprising a plurality of spaced apart blades 117 that are adapted to pivot.

In fact, rotor assembly 111 is constructed in an identical fashion to rotor assembly 11 with one notable distinction: rotor assembly 111 does not include a rotor control mechanism 29. Accordingly, blades 117 in rotor assembly 111 are designed to freely rotate during normal operation (i.e., angular orientation of blades 117 is based entirely in response to centrifugal and fluid flow forces).

Figure 6:
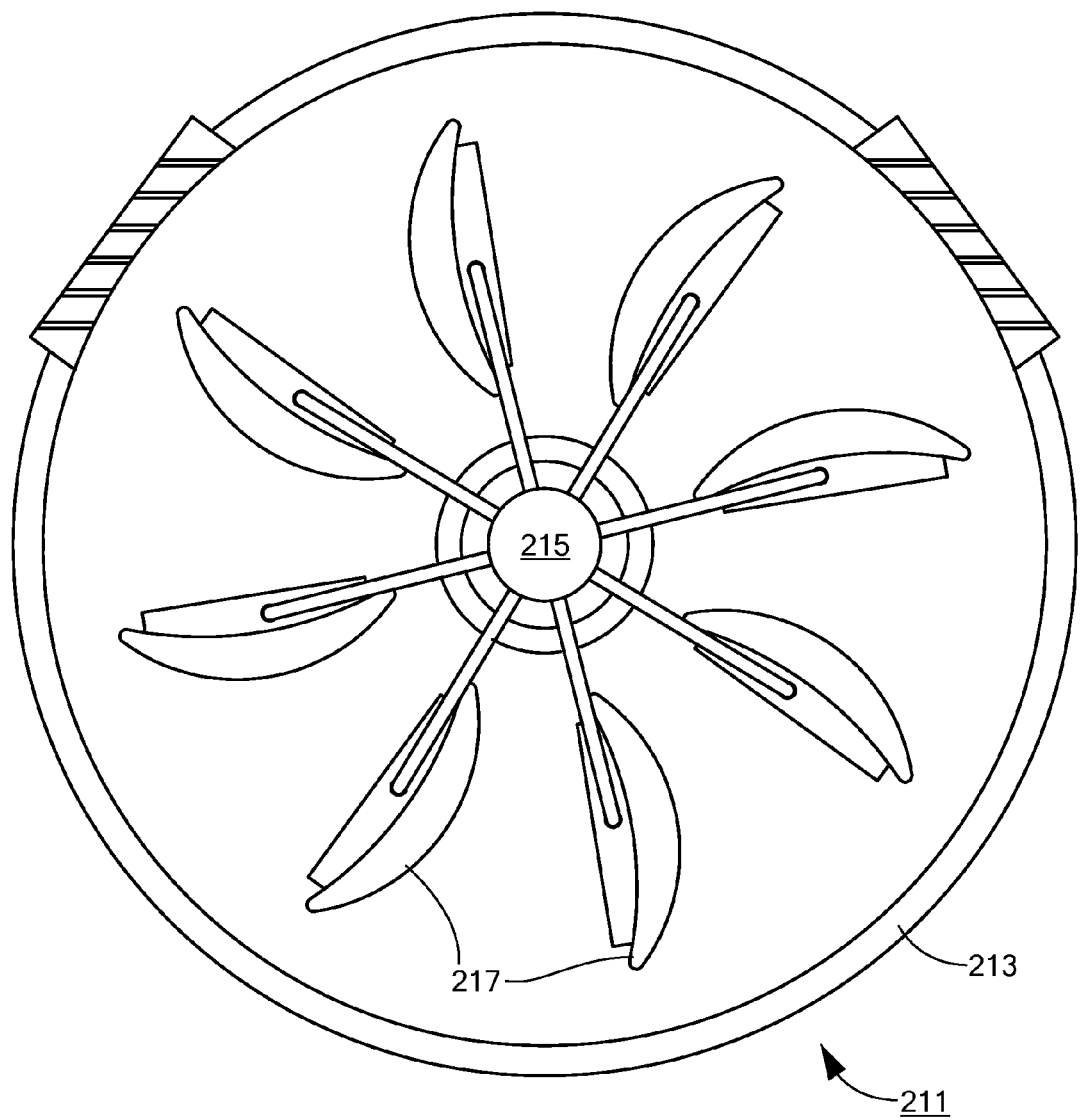
FIG. 6 is a top view of a third embodiment of a rotor assembly constructed according to the teachings of the present invention, the rotor assembly being shown with its cover, vane and baffle removed therefrom to more easily illustrate the orientation of the plurality of blades during normal operation.

As another example, it is to be understood that each blade 47 in rotor assembly 11 could be fixedly coupled to spokes 45, thereby precluding any pivotal movement. Specifically, referring now to FIG. 6, there is shown a simplified schematic representation of a third embodiment of a rotor assembly constructed according to the teachings of the present invention, the rotor assembly being identified generally by reference numeral 211. As can be appreciated, rotor assembly 211 is similar to rotor assembly 11 in that rotor assembly 211 includes a cylindrical outer housing 213 inside which a rotor 215 is adapted to spin, with rotor 215 comprising a plurality of spaced apart blades 217.

Rotor assembly 211 differs primarily from rotor assembly 11 in that blades 217 are fixedly mounted and are incapable of pivotable displacement. Rather, each blade 217 remains fixed in a generally radial orientation.

As yet another example, it is to be understood that rotor assembly 11 could be modified by coupling main shaft 43 of rotor 27 to multiple electromechanical devices 13 using an assortment of gears and pulleys. In this manner, the rotation of single shaft 43 would drive multiple electromechanical devices 13. This redundancy could be used to create a substantial increase in the power output for the resultant turbine.

Potential Applications

It is to be understood that rotor assembly 11 could be incorporated into a wide variety of potential applications. In particular, due to its relatively compact and enclosed construction, rotor assembly 11 could be mounted on various types of structures and utilized in a variety of different uses.

As an example, it is envisioned that rotor assembly 11 could be mounted on a moving object, such as an automobile, plane or boat. In this capacity, it is to be understood that rotor assembly 11 could be used to produce and store electrical power using both (i) naturally occurring wind and (ii) apparent wind created as the object moves.

As another example, it is envisioned that multiple rotor assemblies 11 could be combined and installed in tandem on a common structure (e.g., a tower, building or vehicle) in a stacked relationship. In this manner, power output could be substantially increased without changing the footprint of the mounting surface.

As yet another example, it is envisioned that rotor assembly 11 could be combined with a separate power source to provide a redundant supply of power. For instance, rotor assembly 11 could be mounted onto a pyramidal tower that is covered, on at least one side, by an array of solar panels. In this capacity, rotor assembly 11 and the solar panels could utilize naturally occurring wind and solar power, respectively, to power a common electromechanical device. As can be appreciated, the use of two independent energy sources to power a common electromechanical device provides both enhanced efficiency and power redundancy, which is useful in circumstances when the naturally occurring power source (e.g., sunlight, wind, etc.) is periodically limited.

As yet still another example, it is envisioned that rotor assembly 11 could be mounted on top of a building. For instance, in a residential setting, rotor assembly 11 could be mounted on top of a roof or artificial chimney and can be used to provide either (i) central power to the building or (ii) backup power to an emergency generator or other storage device that is in turn coupled to the main electrical system for the building.

The embodiments shown in the present invention are intended to be merely exemplary and those skilled in the art shall be able to make numerous variations and modifications without departing from the spirit of the present invention. All such variations and modifications are intended to be within the scope of the present invention as defined in the appended claims.

What is claimed is:

1. A rotor assembly for a turbine, the rotor assembly being powered by a fluid flow, the rotor assembly comprising:
   (a) a substantially enclosed outer housing shaped to define an interior cavity, (b) a rotor disposed within the interior cavity, the rotor comprising,
  (i) a main shaft having a longitudinal axis, and
  (ii) a plurality of blades coupled to the main shaft, each of the plurality of blades being coupled to the main shaft by at least one radial spoke, each of the plurality of blades being adapted to pivot relative to the at least one radial spoke between a first position of greater fluid flow resistance and a second position of lesser fluid flow resistance, each of the plurality of blades being adapted to pivot about an axis that is parallel to the longitudinal axis of the main shaft,
  (iii) wherein the rotor is adapted to spin about the longitudinal axis of the main shaft,
(c) a control mechanism for regulating the orientation of the plurality of blades between the first position of greater fluid flow resistance and the second position of lesser fluid flow resistance based on the angular location of each of the plurality of blades within the interior cavity wherein the control mechanism comprises:
  (i) a guide ring disposed within the interior cavity, and
  (ii) a roller coupled to each of the plurality of blades, wherein the roller selectively contacts the guide ring to limit the range of pivotable displacement.

2. The rotor assembly as claimed in claim 1 wherein the outer housing comprises a disc-shaped base and a continuous, cylindrical sidewall that together define the interior cavity.

3. The rotor assembly as claimed in claim 2 further comprising a top cover mounted on the sidewall to substantially enclose the interior cavity.

4. The rotor assembly as claimed in claim 3 wherein the sidewall of the outer housing is shaped to define an inlet port and an outlet port.

5. The rotor assembly as claimed in claim 4 wherein the inlet and outlet ports are located approximately 90 degrees apart from one another about the longitudinal axis defined by the main shaft.

6. The rotor assembly as claimed in claim 4 wherein a selectively enclosable element is mounted in the sidewall of the outer housing within each of the inlet and outlet ports.

7. The rotor assembly as claimed in claim 4 wherein the sidewall of the outer housing includes an outer surface on which is mounted a baffle that is adapted to direct the fluid flow into the interior cavity through the inlet port.

8. The rotor assembly as claimed in claim 7 wherein the baffle includes a pair of panels mounted on the outer surface of the sidewall on opposing sides of the inlet port.

9. The rotor assembly as claimed in claim 4 further comprising an inner housing disposed in the interior cavity, the main shaft of the rotor extending through the inner housing in a coaxial relationship relative thereto.

10. The rotor assembly as claimed in claim 9 wherein the inner housing is separate from the main shaft of the rotor.

11. The rotor assembly as claimed in claim 10 wherein the inner housing is a generally cylindrical member that is disposed in a coaxial relationship relative to the outer housing, the inner housing and the outer housing together defining an annular region within the interior cavity in which the plurality of blades remain disposed.

12. The rotor assembly as claimed in claim 4 wherein each of the plurality of blades has a width that is equal to the width of each of the inlet and outlet ports in the outer housing.

13. The rotor assembly as claimed in claim 2 wherein the disc-shaped base includes an outer surface on which is fixedly mounted a rotating platform.

14. The rotor assembly as claimed in claim 13 wherein an enlarged, flattened vane is coupled to outer housing, the vane being adapted to orientate the outer housing in direct response to the direction of the fluid flow.

15. A rotor assembly for a turbine, the rotor assembly being powered by a fluid flow, the rotor assembly comprising:
(a) a substantially enclosed outer housing shaped to define an interior cavity, the outer housing comprising,
  (i) a disc-shaped base and a continuous, cylindrical sidewall that together define the interior cavity, the sidewall being shaped to define an inlet port and an outlet port, and
  (ii) a top cover mounted on the sidewall to substantially enclose the interior cavity,
(b) a rotor disposed within the interior cavity, the rotor comprising,
  (i) a main shaft having a longitudinal axis, and
  (ii) a plurality of blades coupled to the main shaft, each of the plurality of blades being coupled to the main shaft by at least one radial spoke, each of the plurality of blades being adapted to pivot related to the at least one radial spoke to which it is coupled between a first position of greater fluid flow resistance and a second position of lesser fluid flow resistance,
  (iii) wherein the rotor is adapted to spin about the longitudinal axis of the main shaft, and
(c) a control mechanism for regulating the orientation of the plurality of blades based on the angular location of each of the plurality of blades within the interior cavity, the control mechanism comprising,
  (i) a guide ring disposed within the interior cavity, and
  (ii) a roller coupled to each of the plurality of blades, wherein the roller selectively contacts the guide ring to limit the range of pivotable displacement.

* * * * *